United States Patent
Zhang et al.

(10) Patent No.: US 8,305,061 B1
(45) Date of Patent: Nov. 6, 2012

(54) APPARATUS AND METHOD FOR DIGITALLY CONTROLLED BUCK-BOOST SWITCHING REGULATOR

(75) Inventors: Jianhui Zhang, San Jose, CA (US);
Martin Embacher, Munich (DE);
Frank Trautmann, Munich (DE);
Christian Giassner, Berching (DE)

(73) Assignee: National Semiconductor Corporation, Santa Clara, CA (US)

( * ) Notice: Subject to any disclaimer, the term of this patent is extended or adjusted under 35 U.S.C. 154(b) by 839 days.

(21) Appl. No.: 12/133,111

(22) Filed: Jun. 4, 2008

(51) Int. Cl.
*G05F 1/24* (2006.01)
*G05F 1/00* (2006.01)

(52) U.S. Cl. .................. 323/283; 323/259

(58) Field of Classification Search .......... 323/282–285, 323/259
See application file for complete search history.

(56) References Cited

U.S. PATENT DOCUMENTS

| | | | |
|---|---|---|---|
| 5,949,224 A | 9/1999 | Barkaro | |
| 6,037,755 A | 3/2000 | Mao et al. | |
| 6,166,527 A | 12/2000 | Dwelley et al. | |
| 6,275,016 B1 | 8/2001 | Ivanov | |
| 6,404,172 B1 | 6/2002 | May | |
| 7,129,680 B2 | 10/2006 | Higashitani et al. | |
| 7,154,250 B2 | 12/2006 | Vinciarelli | |
| 7,176,667 B2 | 2/2007 | Chen et al. | |
| 7,265,524 B2 | 9/2007 | Jordan et al. | |
| 7,268,525 B2 | 9/2007 | Ishii et al. | |
| 2004/0155637 A1* | 8/2004 | Chapuis | 323/282 |
| 2005/0285584 A1* | 12/2005 | Kwan | 323/283 |
| 2006/0125458 A1* | 6/2006 | Chapuis | 323/282 |
| 2006/0186866 A1* | 8/2006 | Sharma | 323/282 |
| 2006/0208716 A1* | 9/2006 | Chapuis | 323/283 |

OTHER PUBLICATIONS

Khaligh, A. et al., "Pulse Adjustment, a Novel Digital Control Technique, for Control of a DC-DC Buck-Boost Converter Operating in Discontinuous Conduction Mode and Driving Constant Power Loads," Vehicle Power and Propulsion Conference, IEEE, Sep. 6-8, 2006, pp. 1-5.

Khaligh, A. et al., "Control and Stabilization of DC/DC Buck-Boost Converters Loaded by Constant Power Loads in Vehicular Systems using a Novel Digital Scheme," 12th International Power Electronics and Motion Control Conference, Aug. 2006, pp. 1769-1775.

Chakraborty, A et al., "Digital Combination of Buck and Boost Converters to Control a Positive Buck-Boost Converter," 37th Power Electronics Specialists Conference, IEEE, Jun. 18-22, 2006, pp. 1-6.

Chakraborty, A. et al., "Combination of Buck and Boost Modes to Minimize Transients in the Output of a Positive Buck-Boost Converter," 32nd Annual Conference on Industrial Electronics, IEEE, Nov. 2006, pp. 2372-2377.

(Continued)

*Primary Examiner* — Jue Zhang
(74) *Attorney, Agent, or Firm* — Wade J. Brady, III; Frederick J. Telecky, Jr.

(57) ABSTRACT

A buck/boost regulator controller is provided. The buck-boost regulator controller controls four switches in an H-bridge configuration to control voltage regulation. The buck/boost regulator controller includes a digital error amplifier and buck-boost control logic. The digital error amplifier provides a multi-bit digital error voltage signal that is based on the difference between the output voltage and the desired output voltage. The buck-boost control logic controls the opening and closing of the four switches in the H-bridge based, in part, on the multi-bit digital error voltage signal.

15 Claims, 4 Drawing Sheets

OTHER PUBLICATIONS

Sahu, B. et al., "A High Efficiency WCDMA RF Power Amplifier With Adaptive, Dual-Mode Buck-Boost Supply and Bias-Current Control," Microwave and Wireless Components Letters, IEEE, vol. 17, Issue 3, Mar. 2007, pp. 238-240.

Weissback, R.S. et al., "A Non-Inverting Buck-Boost Converter With Reduced Components Using a Microcontroller," SoutheastCon 2001 Proceedings, IEEE, Mar. 30-Apr. 1, 2001, pp. 79-84.

Danwei, Lui et al., "Design and Implementation of a DSP Based Digital Controller for a Dual Half Bridge Isolated Bi-Directional DC-DC Converter," Twenty-First Annual Applied Power Electronics Conference and Exposition, IEEE, Mar. 19-23, 2006, pp. 1-5.

Quan, Li et al., "Recent Development in Topologies for Photovoltaic Module Integrated Converters," 37th Power Electronics Specialists Conference, IEEE, Jun. 18-22, 2006, pp. 1-8.

LTC3780, "High Efficiency, Synchronous, 4-Switch Buck-Boost Controller," Linear Technology Corporation, 2005, pp. 1-28.

LTC3785, "10V, High Efficiency, Synchronous, No RSENSE Buck-Boost Controller," Linear Technology Corporation, 2007, pp. 1-20.

A8440, "A High Efficiency, Non-Inverting, Buck-Boost DC-DCc Converter," Allegro MicroSystems, IEEE, 2004, pp. 1411-1415.

Sahu, B. et al., "A Low Voltage, Dynamic, Noninverting, Synchronous Buck-Boost converter for Portable Applications," IEEE Transactions on Power Electronics, vol. 19, No. 2, Mar. 2004, pp. 443-452.

* cited by examiner

APPARATUS AND METHOD FOR DIGITALLY CONTROLLED BUCK-BOOST SWITCHING REGULATOR

FIELD OF THE INVENTION

The invention is related to voltage regulators, and in particular but not exclusively, to an apparatus and method for a digitally controlled buck-boost switching regulator.

BACKGROUND OF THE INVENTION

A switching regulator may be configured to provide an output voltage (VOUT) in response to an input voltage (VIN). Typically, a switching regulator includes an inductor that is coupled to a switch. In operation, the inductor current is a triangle wave current based on the opening and closing of the switch, and an output capacitor provides VOUT from the inductor current. Also, the switch is controlled by a control signal, where the duty cycle or the frequency of the control signal is typically modulated based on negative feedback.

A buck regulator may be used to generate a regulated output voltage that is less than the input voltage; conversely, a boost converter may be used to generate a regulated output voltage that is greater than the input voltage. However, DC-DC converters with step up/step down characteristics need to be used when the input and output voltage ranges overlap. For example, a DC-DC converter may be used to convert a voltage from a battery, which may have a voltage from 4.5V to 2.5V, into an output voltage of 3.4 V to 0.8 V.

BRIEF DESCRIPTION OF THE DRAWINGS

Non-limiting and non-exhaustive embodiments of the present invention are described with reference to the following drawings, in which.

DETAILED DESCRIPTION

Figure 1:
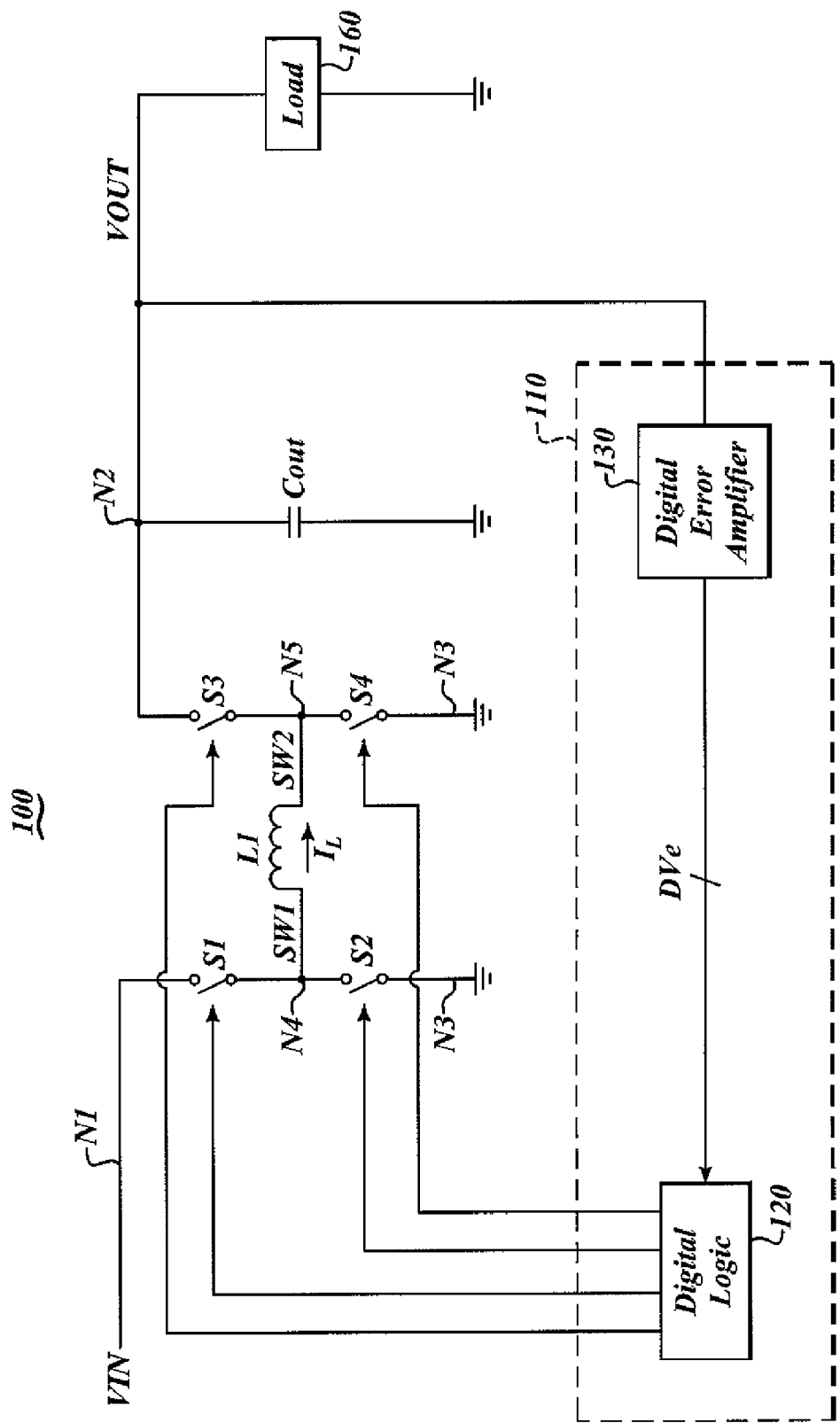
FIG. 1 shows a block diagram of a buck-boost regulator.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar junction transistor (BJT) may be employed as an embodiment of a transistor, the scope of the words "gate", "drain", and "source" includes "base", "collector", and "emitter", respectively, and vice versa.

Briefly stated, the invention is related to a buck/boost regulator controller. The buck-boost regulator controller controls four switches in an H-bridge configuration to control voltage regulation. The buck/boost regulator controller includes a digital error amplifier and buck-boost control logic. The digital error amplifier provides a multi-bit digital error voltage signal that is based on the difference between the output voltage and the desired output voltage. The buck-boost control logic controls the opening and closing of the four switches in the H-bridge based, in part, on the multi-bit digital error voltage signal.

FIG. 1 shows a block diagram of buck-boost regulator 100 driving a load 160. Buck-boost regulator 100 includes switches S1-S4, inductor L1, capacitor Cout, and buck-boost regulator controller 110. Buck-boost regulator controller 110 includes digital 120 and digital error amplifier 130.

Buck-boost regulator controller 110 controls the opening and closing of switches S1-S4 based, in part, on output voltage VOUT. Switches S1-S4 are arranged in an H-bridge configuration in conjunction with inductor L1. The opening and closing of switches S1-S4 provides regulation of output voltage VOUT. Input voltage VIN is converted into output voltage VOUT such that output voltage VOUT is regulated. Inductor L1 and capacitor C1 operate together as an LC filter for the regulation.

Buck-boost regulator controller 110 includes digital error amplifier 130 and digital logic 120. Digital error amplifier 130 is arranged to provide digital error voltage signal DVe based, in part, on output voltage VOUT, such that signal DVe is a multi-bit digital signal. Digital error amplifier 130 is arranged to provide signal DVe such that the value of signal DVe is based on the difference between output voltage VOUT and the voltage to which VOUT is being regulated to. Digital logic 120 is arranged to control the opening and closing of switches S1-S4 to control the voltage regulation. Buck-boost regulator controller 110 is arranged such that it is capable of converting input voltage VIN to output voltage VOUT regardless of whether input voltage VIN is less than, equal to, or greater than the voltage at which output voltage VOUT is to be regulated.

Figure 2:
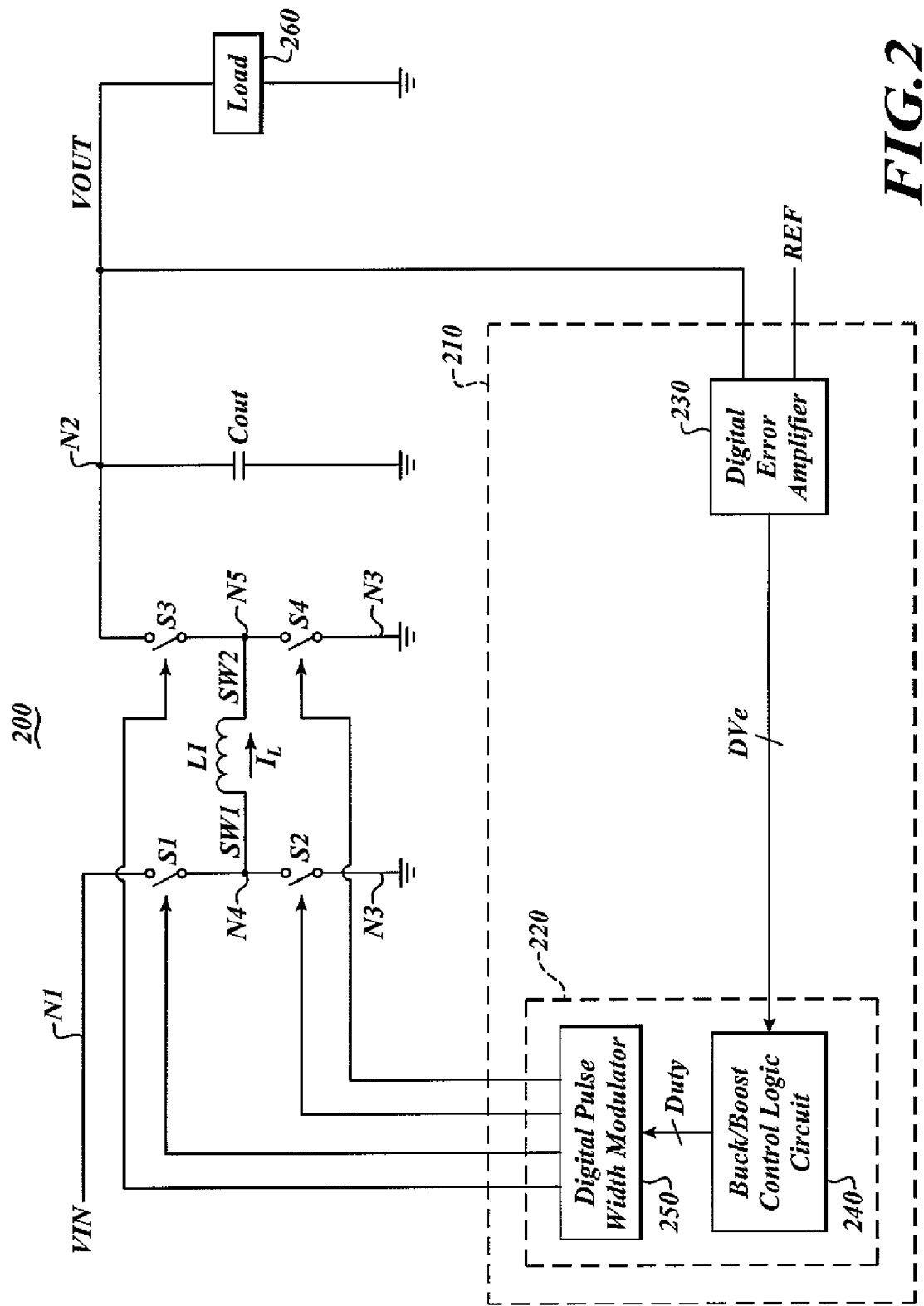
FIG. 2 illustrates a block diagram of the buck-boost regulator of FIG. 1.

FIG. 2 illustrates a block diagram of the buck-boost regulator 200, which may be employed as an embodiment of buck-boost regulator 100 of FIG. 1. Digital logic 220 includes buck/boost control logic circuit 240 and digital pulse width modulator 250. Digital error amplifier 230 is further arranged to receive reference signal REF.

In one embodiment, digital error amplifier 230 is arranged to provide digital error voltage signal DVe such that signal DVe is proportional to the difference between output voltage VOUT and reference signal REF. In another embodiment, a voltage divider (not shown) is employed to generate a feedback voltage (not shown) from the output voltage, and digital error amplifier 230 is arranged to provide digital error voltage signal DVe such that signal DVe is proportion to the difference between the feedback voltage and reference signal REF.

In one embodiment, digital error amplifier 230 includes an analog error amplifier, and an analog-to-digital converter (ADC) that converts the output of the analog error amplifier into digital error voltage signal DVe. In another embodiment, output voltage VOUT or the feedback voltage is converted into a digital signal by an ADC, reference signal REF is digital, and the signal DVe is generated digitally by digitally calculating the difference between the digital reference signal and the output voltage VOUT or feedback voltage. In one embodiment, the digital values are referenced to input voltage VIN. For example, in this embodiment, if a 9-bit analog-to-digital conversion is performed, then LSB (least significant bit) corresponds to 1/512 of input voltage VIN. For example, in a 9-bit analog-to-digital conversion, 111111111 corresponds to VIN.

In preferred embodiments, buck-boost regulator 210 includes not just proportional (P) control, but also includes additional elements to smooth the loop. For example, in various embodiments, buck-boost regulator 210 operates according to PI (proportional-integral) control, or PID (proportional-integral-derivative) control, or the like. This modified version of DVe (obtained by, for example, adding an I term and/or a D term to DVe) is referred to as duty cycle command signal De.

Buck/boost control logic circuit 240 is arranged to provide one or more digital signals Duty based, in part, on digital error voltage signal DVe (as stated, above, signal DVe may be further modified for PI control, PID control, or the like, rather than just the proportional term). Signal(s) Duty includes an indication, for each of the fourth switches S1-S4, what duty cycle that switch should be on for this clock cycle.

Digital pulse width modulator 250 is arranged to control switches S1-S4 such that, for each clock cycle, and for each switch, the switch is on for the amount of time dictated by signal(s) Duty.

In one embodiment, signal Duty is four multi-bit Duty signals, with a separate one of the four signals for each switch. The signal Duty for each switch indicates the duty cycle for which that switch should be on for this clock cycle. Digital Pulse Width Modulator 250 either generates an internal clock signal (not shown) CLK, or receives signal CLK as an external clock signal (not shown). In one embodiment, digital pulse width modulator 250 includes a counter in which is clocked as a frequency that is $2^N$ times as signal CLK. For each clock cycle, the signal controlling that switch is asserted for a number of clock cycles of the counter indicated by the value of the corresponding signal Duty for that clock. In other embodiments, digital pulse width modulator 250 generates signal for controlling switches S1-S4 in another way so that the duty cycle corresponds to the corresponding signal Duty.

In one embodiment, buck/boost control logic circuit 240 generate signal Duty as follows. Regulator controller 210 operates in two modes, buck mode and boost mode. If De is less than the value that corresponds to VIN (e.g., 1023 for a 10-bit A/D embodiment), then buck regulation is performed. For a clock cycle in which buck regulation is performed, switch S3 remains on for the entire clock cycle (100% duty cycle), switch S4 remains off for the entire clock cycle (0% duty cycle), switch 51 has a duty cycle equal to De, and switch S2 has a duty cycle equal to 1-De (switch S2 is off while switch 51 is on, and vice versa). For a clock cycle in which boost regulation is performed, switch 51 remains on for the entire clock cycle (100% duty cycle), switch S2 remains off for the entire clock cycle (0% duty cycle), switch S4 has a duty cycle equal to De−1, and switch S3 has a duty cycle equal to 2-De (switch S3 is off while switch S4 is on, and vice versa).

In another embodiment, buck/boost control logic circuit 240 generates signal Duty as follows. Regulator controller 201 operates in three modes, buck mode, boost mode, and buck/boost mode. There is a maximum buck duty cycle and a minimum boost duty cycle. In between the maximum buck duty cycle and the minimum boost duty cycle, buck/boost regulation in performed. The maximum buck duty cycle and the minimum boost duty cycle are fixed in one embodiment, and are user-programmable in another embodiment.

In buck-boost mode, the regulation is time-division multiplexed (TDM) between buck and boost mode operations. In some embodiments, the ratio between buck and boost mode operation (the TDM ratio) over a fixed time is linearly proportional to De. In other embodiments, in buck-boost mode the TDM ratio is fixed, and the duty cycle is adjusted based on De.

Figure 3:
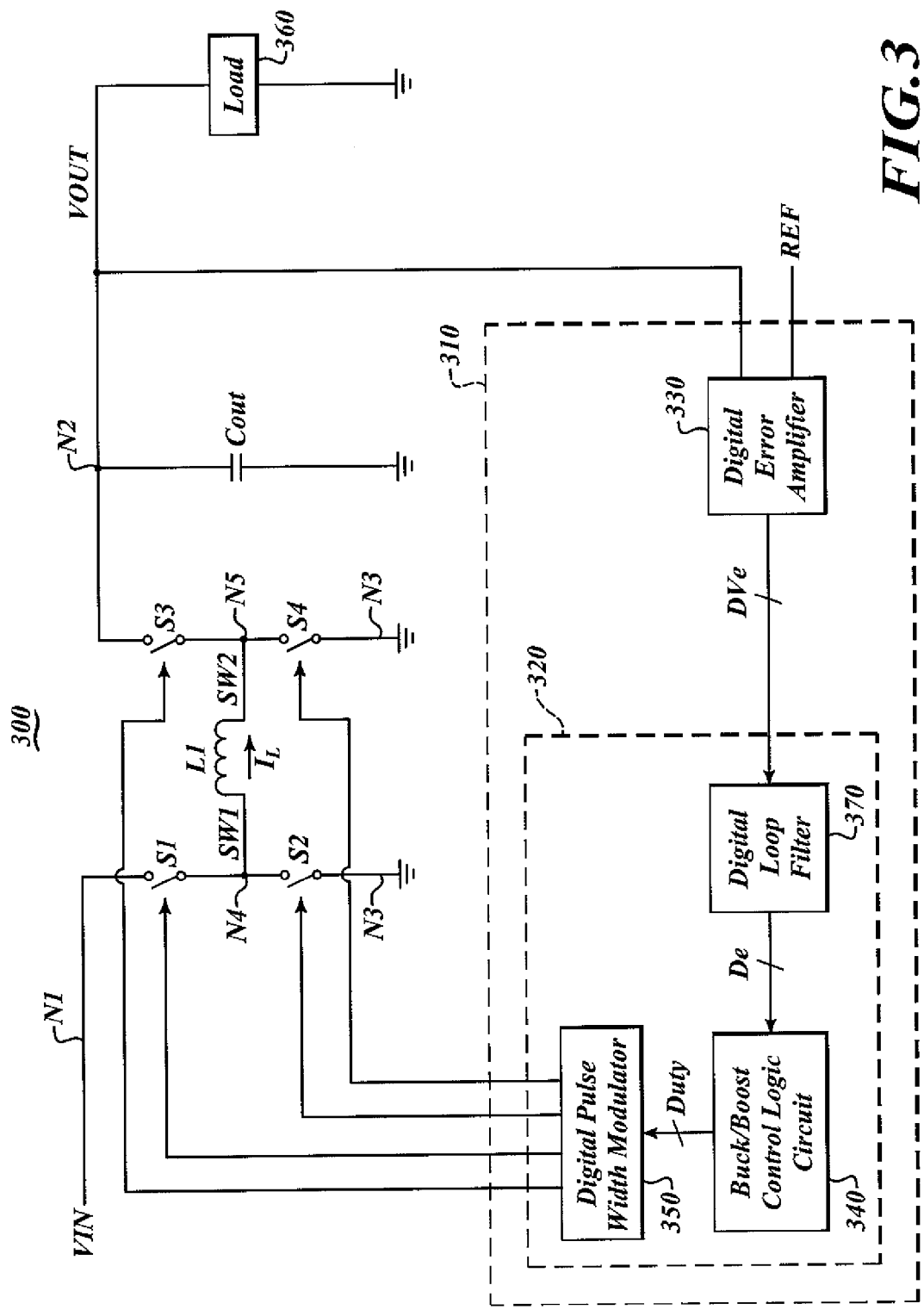
FIG. 3 shows a block diagram of an embodiment of the buck/boost regulator of FIG. 2.

FIG. 3 shows a block diagram of an embodiment of the buck/boost regulator 300, which may be employed as an embodiment of buck/boost regulator 200 of FIG. 2. Digital logic 320 further includes digital loop filter 370.

Digital loop filter 370 is arranged to provide duty cycle command signal De based on digital error voltage signal DVe. Digital loop filter 370 is arranged to generate an integral term (I) that is proportional to the integral of DVe, and a derivative term (D), that is proportional to the derivative of DVe, and to provide De such that De=DVe+I+D, thus providing PID (Proportional Integral Derivative) control.

In one embodiment, buck/boost mode control logic circuit 240 operates as follows.

1. Buck Mode Operation

When De is less than the maximum buck switch duty cycle $D_{buck\_max}$, the buck-boost regulator operates in buck mode. In this mode, S3 is always on and S4 is always off, and S1 and S2 turn on alternatively, with the duty cycle of buck switch S1 Duty=De.

2. Boost Mode Operation

When De is greater than $1+D_{boost\_min}$, the buck-boost regulator operates in boost mode. In this mode, S1 is always on and S2 is always off, and S3 and S4 turn on alternatively, with the duty cycle of boost switch S4 Duty=De−1.

3. Buck-Boost Mode Operation (Varying TDM Ratio Embodiment)

When the digital loop filter output $D_{buck\_max}<De<1+D_{boost\_min}$, the buck-boost regulator operates in buck-boost mode. The buck/boost mode control logic multiplexes in time domain between buck and boost mode operation and generate the corresponding control signals for buck switch pair S1, S2 and boost switch pair S3, S4. In one embodiment, the duty cycle for S1 is fixed at $D_{buck\_max}$ and the duty cycle of S4 is fixed at $D_{boost\_min}$. The ratio between buck and boost mode operation over a fixed time period is linearly proportional to De.

As an example, dividing the De into M segments when $D_{buck\_max}<De<1+D_{boost\_min}$ then the ratio between buck and boost mode operation decreases linearly from (M−1)/1 to 1/(M−1) when De increases from $D_{buck\_max}$ to $1+D_{boost\_min}$. The buck and boost regions are spread out evenly from each other. For example, in the buck-boost region, if De is equal to the average of $D_{buck\_max}$ and $1+D_{boost\_min}$, then half of the clock cycles in a fixed region will be in the buck region and the other half will be in the boost region, so that one cycle is buck, the next is boost, the next is buck, the next is boost, and so on. If one-third of the clock cycles are to be buck and two-thirds to be boost, then the order is buck-boost-boost-buck-boost-boost-buck-boost-boost, etc., so that the buck regions are evenly spread out from each other over the fixed interval.

For example, in one embodiment, the A/D quantization of the error voltage is a 10-bit conversion, and 1111111111 (1023) correspond to VIN. In this embodiment, the buck/boost region is symmetrical, and Dbuck_max=1023-x, and Dboost_min=x. In other embodiments, the buck boost region may be asymmetrical. In some embodiments, the value x is fixed, and in other embodiments, it is user programmable. As one example, x=16, Dbuck_max=1007, and Dboost_min=16. If De=1011, then for the next 32 clock cycles, four of those clock cycles operate in boost mode, and the other 28 operate in buck mode, with the four clock cycles of boost mode being spread out evenly over the 32 clock cycles.

In another embodiment, buck mode and boost mode work as described above, but buck-boost mode operates in a different manner, as described below in Buck-Boost Mode Operation (varying duty cycle embodiment).

4. Buck-Boost Mode Operation (Varying Duty Cycle Embodiment)

When the digital loop filter output $D_{buck\_max} < De < 1+D_{boost\_min}$, the buck-boost regulator operates in buck-boost mode. In this mode of operation, the buck/boost mode control logic alternates between buck and boost mode operation for each duty cycle.

The buck/boost mode control logic alternates between buck and boost mode operation and generates the corresponding control signals for buck switch pair S1, S2 and boost switch pair S3, S4. The buck and boost modes are interleaved in a 1:1 ratio in this embodiment. During the buck cycles, the duty cycle is De-y, and the boost cycles, the duty cycles is (De-1)+y. In some embodiments, y is programmable, and in other embodiments, y is fixed. The parameter y is greater than or equal to x. In some embodiments, y=2*x. The parameter y is subtracted from the buck cycles and added to the boost cycles so that the duty cycle does not exceed 100% for the buck cycles, or go below 0% for the boost cycles. By subtracting y during the buck cycles, and adding y to the boost cycles, with y being the same in each case, the effect of y on the output voltage is cancelled out.

For example, in one embodiment, the A/D quantization of the error voltage is a 10-bit conversion, and 1111111111 (1023) correspond to VIN. In this embodiment, the buck/boost region is symmetrical, and Dbuck_max=1023-x, and Dboost_min=x. In other embodiments, the buck boost region may be asymmetrical. In some embodiments, the value x is fixed, and in other embodiments, it is user programmable. As one example, x=16, y=2*x=32, Dbuck_max=1007, and Dboost_min=16. If De=1009, then switches S1-S4 are be operated in buck and boost mode in an interleaved way, with buck duty cycle=De-y=1009-32=977 and boost duty cycle=(De-1023)+y=(1009-1023)+32=18.

As discussed above, in various embodiments, during the buck/boost regulation, time-multiplexing occurs between buck regulation control and boost regulation control, with either the TDM ratio been maintained constant and varying the duty cycle to adjust the output voltage, or keeping the duty cycle constant and varying the TDM ratio to adjust the output voltage. In other embodiments, varying both the TDM ratio and the duty cycle may be used to adjust the output voltage. These variations and others are within the scope and spirit of the invention.

Figure 4:
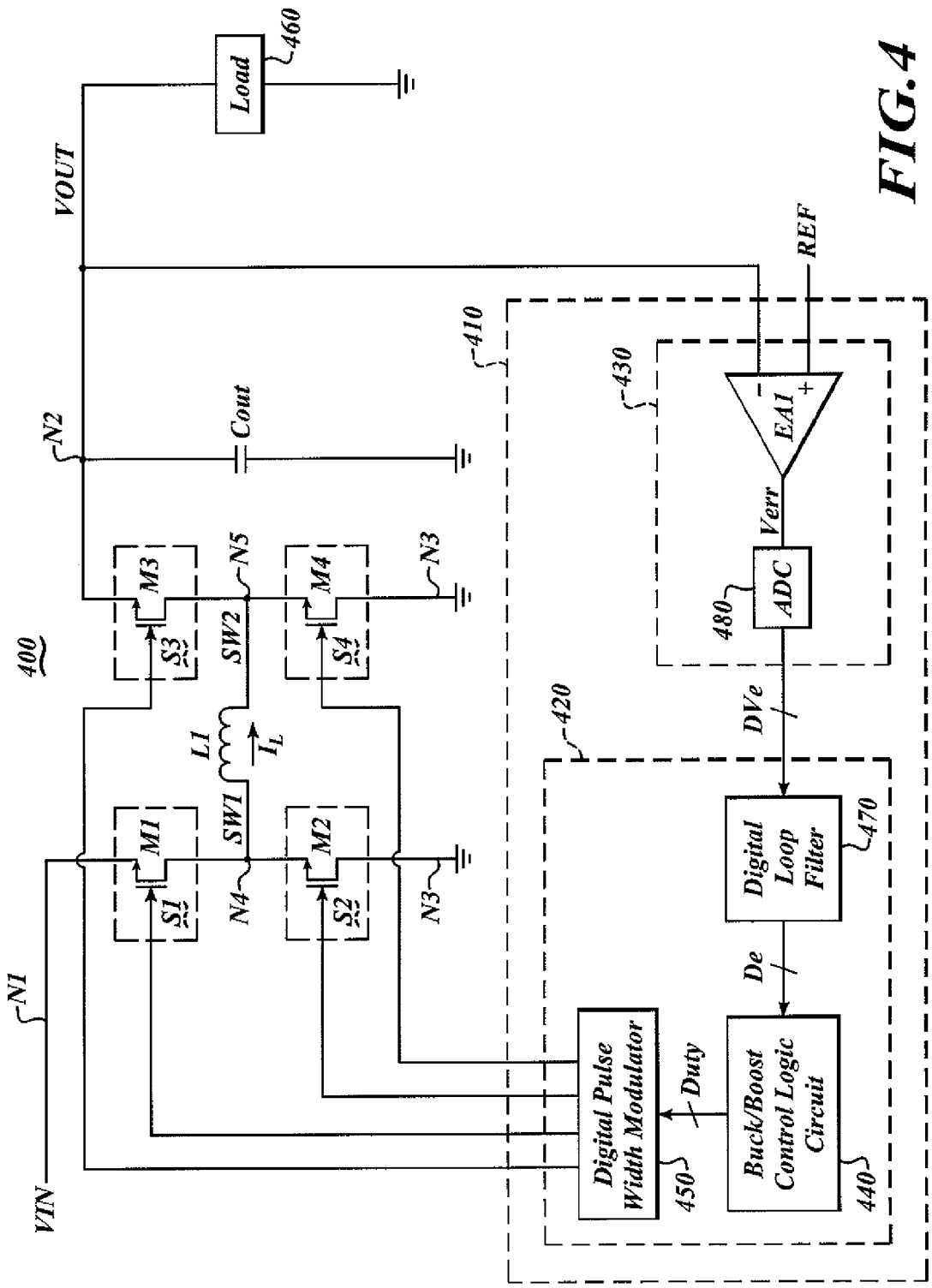
FIG. 4 illustrates a block diagram of an embodiment of the buck/boost regulator of FIG. 3, arranged in accordance with aspects of the present invention.

FIG. 4 illustrates a block diagram of an embodiment of the buck/boost regulator 400, which may be employed as an embodiment of buck/boost regulator 300 of FIG. 3. Digital error amplifier 430 includes error amplifier EA1 and analog-to-digital converter (ADC) 480.

Error amplifier EA1 is a differential amplifier. It does not require an analog compensation loop since the control loop of buck-boost regulator 400 is digital. Error amplifier EA1 is an analog error amplifier that generates an analog error voltage Verr. In one embodiment, EA receives reference voltage REF and output voltage VOUT, and provides error voltage Verr such that Verr is proportional to the difference between REF and VOUT. In another embodiment, EA receives feedback voltage Vfb (generated by applying output voltage VOUT to a voltage divider) and reference voltage REF, and provides error voltage Verr such that Verr is proportional to the difference between feedback voltage Vfb and reference voltage REF.

Analog-to-digital converter 480 is arranged to provide digital error voltage signal DVe by performing analog-to-digital conversion on error voltage Verr such that digital error voltage signal DVe is referenced to input voltage VIN.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for regulation, comprising:
  a buck-boost regulator controller, including:
    a digital error amplifier that is arranged to provide a digital error signal that is based, at least in part, on a difference between an output voltage and a reference voltage, wherein the digital error signal is a multi-bit digital signal; and
    buck-boost control logic that is arranged to determine switching duty cycles for switching regulation based, at least in part, on the digital error signal, wherein the buck-boost control logic includes:
      a buck/boost mode control logic circuit that is arranged to provide a plurality of duty cycle signals based, at least in part, on the digital error signal; and
      a digital loop filter that is arranged to provide a duty cycle command signal based, in part, on the digital error signal, wherein the buck/boost mode control logic circuit is arranged to provide the plurality of duty cycle signals based, in part, on the duty cycle command signal, and wherein
    the buck/boost mode control logic circuit is arranged to provide the plurality of duty cycle signals to control the buck/boost regulation based on the duty cycle command signal as follows;
  when De is less than Dbuck_max, provide the plurality of duty cycle signals such that buck regulation control is provided, where De is a value of the duty cycle command signal, and Dbuck_max is a maximum duty cycle for the buck regulation;
  when De is greater than 1+Dboost_min, provide the plurality of duty cycle signals such that boost regulation control is provided, where Dboost_min is a minimum duty cycle for the boost regulation; and
  when De is greater than Dbuck_max and less than 1+Dboost_min, provide the plurality of duty cycle signals such that buck-boost mode regulation control is provided.

2. The circuit of claim 1, wherein
  the buck-boost regulator controller further includes a pulse width modulator that is arranged to control four switches to control buck-boost regulation of the output voltage, wherein the buck-boost regulator controller is arranged to control the four switches based, at least in part, on the digital error signal.

3. The circuit of claim 1, further comprising:
an H-bridge including four switches, wherein the buck-boost regulator controller further includes a pulse width modulator that is arranged to control the four switches to control buck-boost regulation of the output voltage, wherein the buck-boost regulator controller is arranged to control the four switches based, at least in part, on the digital error signal.

4. The circuit of claim 1, wherein,
the digital error amplifier includes:
an analog-to-digital converter that is arranged to provide a digitized output signal by performing digital-to-analog conversion on the output signal; and
digital error circuitry that is arranged to provide the digital error signal by determining a difference between the digitized output signal and a digital reference signal, and multiplying the difference by a gain value.

5. The circuit of claim 1, wherein
the digital error amplifier includes:
an error amplifier that is arranged to provide an analog error signal based, at least in part, on the output voltage and the reference voltage; and
an analog-to-digital converter that is arranged to provide the digital error signal by performing analog-to-digital conversion on the analog error signal.

6. The circuit of claim 5,
wherein
the buck-boost regulator controller is arranged to control conversion of an input voltage into the output voltage such that the output voltage is regulated, and
wherein the analog-to-digital converter is arranged to provide a digital error signal by performing analog-to-digital conversion on the analog error signal such that the digital error signal is referenced to the input voltage.

7. The circuit of claim 6, wherein
the buck-boost regulator controller further includes:
a pulse width modulator that is arranged to control four switches to control buck-boost regulation of the output voltage, wherein the buck-boost regulator controller is arranged to control the four switches based, at least in part, on the digital error signal, such that the duty cycle for which the four switches are closed is based on the plurality of duty cycle signals.

8. The circuit of claim 1, wherein
the buck/boost mode control logic circuit is further arranged to provide the plurality of duty cycle signals to control the buck/boost regulation based on the duty cycle command signal as follows:
when De is greater than Dbuck_max and less than 1+Dboost_min, provide the plurality of duty cycles such that buck-boost mode regulation control is provided as follows:
time-multiplexing between buck regulation control and boost regulation control, while adjusting at least one of the following based on De: a time-division multiplexing ratio between the buck regulation control and the boost regulation control, or the duty cycle.

9. The circuit of claim 1, wherein
the buck/boost mode control logic circuit is further arranged to provide the plurality of duty cycle signals to control the buck/boost regulation based on the duty cycle command signal as follows:
when De is greater than Dbuck_max and less than 1+Dboost_min, provide the plurality of duty cycles such that buck-boost mode regulation control is provided as follows:
time-multiplexing between buck regulation control and boost regulation control, such that the ratio between buck mode operation and boost mode operation over a fixed period of time is linearly proportional to De.

10. The circuit of claim 1, wherein
the buck/boost mode control logic circuit is further arranged to provide the plurality of duty cycle signals to control the buck/boost regulation based on the duty cycle command signal as follows:
when De is greater than Dbuck_max and less than 1+Dboost_min, provide the plurality of duty cycles such that buck-boost mode regulation control is provided as follows:
time-multiplexing between buck regulation control and boost regulation control with a fixed ratio between buck regulation and boost regulation, while adjusting the duty cycle based on the duty cycle command signal.

11. The circuit of claim 10, wherein
the buck/boost mode control logic circuit is further arranged to provide the plurality of duty cycle signals to control the buck/boost regulation based on the duty cycle command signal as follows:
the buck/boost mode operation is performed within a symmetrical window of De values, such that Dbuck_max=1−x and Dbuck_max=X, where x is a programmable or fixed value; and
when De is greater than Dbuck_max and less than 1+Dboost_min, provide the plurality of duty cycles such that buck-boost mode regulation control is provided as follows:
time-multiplexing between buck regulation control and boost regulation control in alternating cycles, wherein each buck cycle has a duty cycle of De−y, and each boost cycle has a duty cycle of (De−1)+y, where y is a programmable or fixed value that is greater than or equal to x.

12. A method for regulation, comprising:
regulating an output voltage, including:
providing a digital error signal that is based, at least in part, on a difference between the output voltage and a reference voltage, wherein the digital error signal is a multi-bit digital signal;
determining switching duty cycles for switching regulation based, at least in part, on the digital error signal;
providing a duty cycle command signal that is based, at least in part, on the digital error signal; and
determining the switching duty cycles for the switching regulation based, at least in part, on the duty cycle command signal, wherein determining the switching duty cycles for the switching regulation includes:
when De is less than Dbuck_max, determining the switching duty cycles such that buck regulation control is provided, where De is a value of the duty cycle command signal, and Dbuck_max is a maximum duty cycle for buck regulation;
when De is greater than 1+Dboost_min, determining the switching duty cycles such that boost regulation control is provided, where Dboost_min is a minimum duty cycle for boost regulation; and when De is greater than Dbuck_max and less than 1+Dboost_min, determining the switching duty cycles such that buck-boost mode regulation control is provided.

13. The method of claim 12, wherein regulating the output voltage further includes:
opening and closing a plurality of four switches in accordance with the determined duty cycles, wherein the determined duty cycles include four determined duty cycles—one for each of the plurality of four switches.

14. The method of claim 12, wherein when De is greater than Dbuck_max and less than 1+Dboost_min, determining the switching duty cycles includes:
time-multiplexing between buck regulation control and boost regulation control, such that the ratio between buck mode operation and boost mode operation over a fixed period of time is linearly proportional to De.

15. The method of claim 12, wherein
the buck/boost mode operation is performed within a symmetrical window of De values, such that Dbuck_max−1−x and Dbuck_max, where x is a programmable or fixed value, and
wherein time-multiplexing between the buck regulation control and the boost regulation control includes:
time-multiplexing between buck regulation control and boost regulation control in alternating cycles, such that each buck cycle has a duty cycle of De−y, and each boost cycle has a duty cycle of (De−1)+y, where y is a programmable or fixed value that is greater than or equal to x.

* * * * *